United States Patent [19]

Seidel

[11] 4,334,808
[45] Jun. 15, 1982

[54] CUTTING INSERT
[75] Inventor: Heinz H. Seidel, Troy, Mich.
[73] Assignee: GTE Products Corporation, Stamford, Conn.
[21] Appl. No.: 166,737
[22] Filed: Jul. 7, 1980
[51] Int. Cl.³ .............................................. B26D 1/00
[52] U.S. Cl. .................................................. 407/114
[58] Field of Search ................ 407/113, 114, 115, 116

[56] References Cited

U.S. PATENT DOCUMENTS

| | | | |
|---|---|---|---|
| 3,399,442 | 9/1968 | Jones et al. | 407/114 |
| 3,487,515 | 1/1970 | Contrucci | 407/114 |
| 3,786,540 | 1/1974 | Lundgren | 407/114 |
| 3,786,541 | 1/1974 | Lundgren | 407/116 |
| 3,792,515 | 2/1974 | Lundgren | 407/116 |
| 3,882,580 | 5/1975 | Lundgren | 407/114 |
| 3,885,281 | 5/1975 | Stambler | 407/114 |
| 4,056,872 | 11/1977 | Seidel | 407/114 |
| 4,189,265 | 2/1980 | Arnold et al. | 407/114 |

*Primary Examiner*—Harrison L. Hinson
*Attorney, Agent, or Firm*—Robert E. Walter

[57] ABSTRACT

A cutting insert of the indexable type comprises intersecting planar surfaces which form a pair of chip control channels associated with a respective cutting edge. The channels merge at respective corners and terminate at an intermediate land portion which is interposed one planar surface and the lowermost portion of the channels.

1 Claim, 3 Drawing Figures

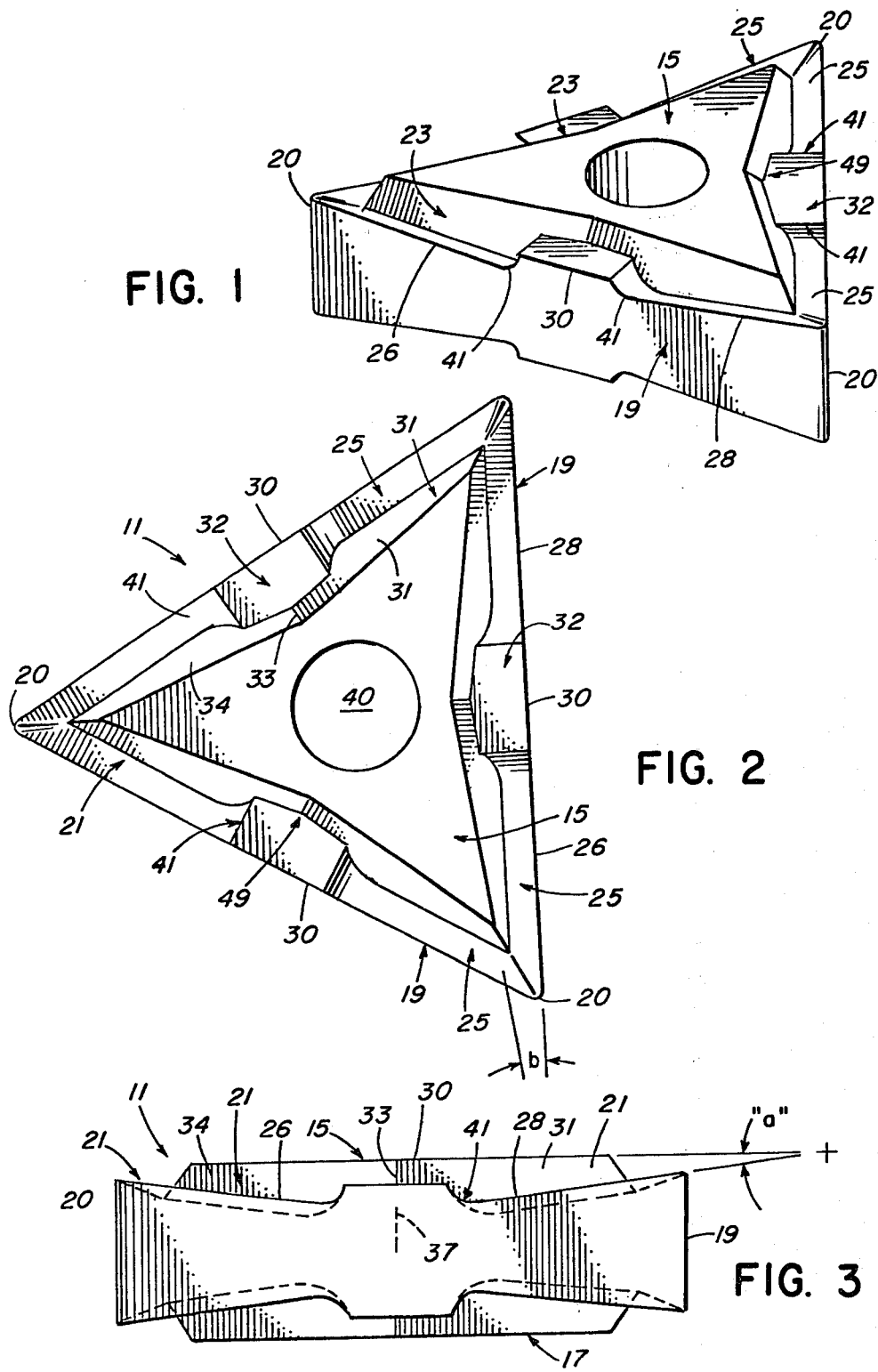

CUTTING INSERT

The present invention relates to disposable cutting inserts, particularly to cutting inserts such as are adapted for being detachably mounted on a tool holder and for cutting a work piece.

Cutting inserts of a type referred to are generally made of a cemented metal carbide and are formed by pressing techniques after which the pressed articles are sintered.

In the type of inserts referred to herein, it is desirable to have an indexable insert which presents a positive rake cutting edge to the work piece. Inserts of this type are described in the following discussed patents.

U.S. Pat. No. 3,487,515 to Contrucci discloses an insert having top and bottom supporting surfaces comprising an island spaced inward from the peripheral sides adjacent the cutting points and extending out to the peripheral sides intermediate the cutting points to increase the stability of support for the insert.

U.S. Pat. No. 3,885,281 to Stambler discloses an insert having both longitudinally curved and transversely curved channels along the side edges of the insert meeting at the corners of the insert. At each corner of the insert, V-shaped shallow grooves are depressed into the merging portions of the deeper longitudinal channels to provide chip control for shallow depth cuts.

U.S. Pat. No. 3,882,580 to Lundgren describes a cutting insert of the type having a longitudinal groove extending entirely around the insert adjacent the side surfaces wherein an inactive portion of the cutting edge has a continously decreasing rake angle.

U.S. Pat. No. 3,786,541 to Lundgren relates to a cutting insert having chip breakers in two stages wherein the cutting edge and the associated chip breaker describe a curve of a particular description.

U.S. Pat. No. 4,056,872, which issued to the inventor of the present application, relates to an insert having inner and outer portions of the chip breaking channel being provided with straight faces.

U.S. Pat. No. 3,792,515 to Lundgren relates to a cutting insert wherein the cutting edge and associated chip-breaker describe a curve composed of straight or arched parts in the plane of the side face.

U.S. Pat. No. 3,786,540 describes an insert having chip control groove extending along a side surface. The width of the groove describes a compound curve such that the width varies along the length of the side in such a manner that the width at the midpoint of the side is less than the width at points intermediate the midpoint and the ends of the side.

U.S. Pat. No. 3,399,442 to Jones describes an insert having chip control groove along the entire outer edge comprises an inner and outer region. The outer region is concave in cross section.

SUMMARY OF THE INVENTION

In accordance with the present invention there is provided a cutting insert comprising a polygonal body having substantially parallel surfaces and peripheral side surfaces substantially normal to said parallel surfaces joining to form corners corners of said polygon, at least one of said parallel surfaces having grooved recesses merging at and descending from respective corners of said polygon adjacent respective peripheral side surfaces, inner land portion extending downwardly and outwardly from said at least one parallel surface toward side surfaces, each inner land portion comprising a pair of substantially planar face portions intersecting at a common juncture, each grooved recess including a planar outer land portion joining a respective planar face portion to form said grooved recess, said planar outer land extending inwardly and downwardly at an acute angle from a side surface to form a cutting edge therewith, each side surface having associated therewith a pair of planar outer land portions and an intermediate planar land portion, said intermediate land portion extending to said inner land portion and to said outer land portions along a plane at an angle of ninety degrees or greater to a respective side surface for terminating respective grooved recesses, said intermediate land portion being interposed said one parallel surface and the lowermost portion of said channel.

The provision of the intermediate land as described enhances the stability of the insert.

DESCRIPTION OF DRAWINGS

FIG. 1 is a perspective view of one embodiment of the preferred invention;

FIG. 2 is a top plan view of the embodiment of FIG. 1; and

FIG. 3 is a side elevational view of the embodiment as shown in FIG. 2.

DETAILED DESCRIPTION

With reference to FIG. 1, there is illustrated a cutting insert 11 in accordance with the preferred embodiment of the present invention. As shown, the cutting insert 11 comprises a polygonal body having substantially parallel surfaces 15, 17 in the form of respective upper and lower surfaces and peripheral side surfaces 19 substantially normal to the upper and lower surfaces 15, 17. The side surfaces 19 meet to form corners 20 at the ends of the side surfaces 19. At least one of the parallel surfaces 15, 17 has chip control channels or grooved recesses 21 merging at and descending from each of the respective corners 20 of the polygon. Channels 21 extend adjacent the peripheral side surfaces 19. Although the insert 11 shown in the drawings is triangular in shape, it is contemplated that the insert 11 may be in the shape of any polygon such as square, diamond or rectangular.

As further illustrated in FIG. 1, the insert 11 includes a plurality of planar outer land portions 25 associated with and forming at least a pair of cutting edges 26, 28 with each side surface 19. Cutting edges 26, 28 are formed by the intersection of each of the outer land portions 25 with a respective side surface 19. Each of the outer land portions 25 forms an angle less than 90° or an acute angle with an adjacent peripheral side surface 19. This first direction is downwardly toward the interior of the insert 11 within a plane normal to a peripheral side surface 19. The slope of the outer lands 25 in the first direction imparts a positive rake angle to the cutting edges 26, 28.

Each of the outer lands 25 descend downwardly in a second direction from one of the corners 20 along respective peripheral sides surfaces 19 toward an adjacent one of the corners 20. When the outer land portions 25 are observed from a planar view as illustrated in FIG. 3, each of the outer land portions 25 extends downwardly in the second direction at an acute angle from a respective corner 20. This angle is shown as angle a in FIG. 2. This second direction is normal to the first direction hereinbefore discussed. It is preferred that angle "a" is of about 6°. The slope of outer lands 25 in the second direction influences the direction of chip flow.

An intermediate edge 30 is formed by the intersection of an intermediate land 32 with a respective side surface 19. As illustrated in FIG. 3, the intermediate land 32 extends inwardly at an angle of 90° or greater from a respective side surface 19. The intermediate land 32 is substantially parallel to the hereinbefore mentioned parallel upper and lower surfaces 17, 19 and interposed parallel surface 15 and to lowermost portion of the channels 21.

Inner land portions 23 extend downwardly and outwardly from a respective surface 15, 17 toward a respective side surface 19. Each peripheral side surface 19 has an inner land portion 23 associated therewith and spaced inwardly therefrom. Each of the inner land portions 23 has end portions spaced inwardly from the polygonal corners 20. The end portions rise above the outer land portions 25 merging at the corners 20. The inner land portions 23 comprises a pair of substantially planar face portions 31 and 34 intersecting at a common juncture 33 which extends downwardly from a respective parallel surface 15, 17 toward the interior of the insert 11. The common juncture 33 intersects the plane of the intermediate land 32. With reference to FIG. 2, it can also be seen that intersection of face portion 31 with surfaces 15 forms an angle "b" with side surface 18 of about 6°. The adjoining straight faced portion 34 similarly forms this angle with a side surface 19 but in an opposing manner to that illustrated for face portion 31.

Each of the face portions 31, 32 and a contiguous portion of the respective outer land portions 25 are joined to form the channels 21 which are associated with a cutting edges 26, 28. Each of the cutting edges 26, 28 as hereinbefore described includes one of the respective channels 21 adjacent to and extending along a length thereof. As illustrated in FIG. 2, the channels 21 terminate at the junction of the outer land portion 25 with the intermediate land portion 32. Thus, the chip control channel normally associated with an insert of this type as described in U.S. Pat. No. 4,056,872 is interrupted at an intermediate portion of the cutting edge and does not extend entirely around the periphery of the insert 11.

As illustrated in detail in FIG. 1, each of the side surfaces 19 has associated therewith a pair of planar outer land portions 25 and a single intermediate planar land portion 32. The intermediate land portion 32 is interposed the pair of outer land portions 25 and connected thereto at the respective junction regions 41. Each of the junction regions 41 is formed by the meeting of respective outer land portions 25 with the intermediate land 32 so as to blend one land into the other. The meeting at the junctions 41 may be in the form of a fillet joining the intermediate land 32 at one elevation with outer land portions 25 at different elevations. Additional junction regions 49 are formed at the meeting of the intermediate land portion 32 with the inner land portion 23.

Outer land portions 25 which are spaced apart by an intervening intermediate land portion 32 lie in planes which intersect at a second common juncture 37 shown as a dotted line in FIG. 3. The line 37 is formed by an extension of the respective planes below the intermediate land 32. The common junctures 33 and 37 meet in an adjoining relationship and form an angle therebetween. The preferred angle of the junctures 33 and 37 is within the range of from 120° to about 140°. For a square insert 11 the preferred angle for the juncture 33 is from about 125° to about 137°. For a triangular insert the preferred range is from about 121° to about 127°. Each of the described junctures 33 and 37 are substantially centrally located from the ends of a respective side.

The insert 11 includes a central opening 40 extending therethrough to faciliate positioning the insert 11 in a tool holder. The opening 40 provides a means whereby a mating member can be fitted within the opening 40 to secure the insert to the work holder. It is also possible to use a center post and washer-nut combination to hold the insert in place in addition to several other well known securing devices. When the insert 11 of the present invention is positioned in a negative rake holder of the type wherein the insert is tilted downwardly, the insert of the present invention provides a positive back rake angle to the work piece along the respective cutting edges 26, 28 eminating from the corners 19 thereof and a negative back rake angle at the intermediate edge portion 30.

While there have been shown and described what are presently considered the preferred embodiments of the present invention, it will be obvious to those skilled in the art that various changes and modifications may be made therein without departing from the scope of the invention as defined by the appended claims.

I claim:

1. A cutting insert comprising a polygonal body having substantially parallel surfaces and peripheral side surfaces substantially normal to said parallel surfaces joining to form corners of said polygon, at least one of said parallel surfaces having grooved recesses merging at and descending from respective corners of said polygon adjacent respective peripheral side surfaces, inner land portions extending downwardly and outwardly from a parallel surface toward side surfaces, each inner land portion comprising a pair of substantially planar face portions intersecting at a common juncture, each grooved recess including a planar outer land portion joining a respective planar face portion, said planar outer land extending inwardly and downwardly at an acute angle from a side surface to form a cutting edge therewith, each side surface having associated therewith a pair of planar outer land portions and an intermediate planar land portion, said intermediate land portion extending to said inner land portion and to said outer land portions along a plane at an angle of ninety degrees or greater to a respective side surface for terminating respective grooved recesses, said intermediate land portion being interposed said one parallel surface and the lowermost portion of said channel.

* * * * *